United States Patent [19]

Colbourne

[11] Patent Number: 5,666,225
[45] Date of Patent: Sep. 9, 1997

[54] MULTI-PASS ETALON FILTER

[75] Inventor: Paul Colbourne, Nepean, Canada

[73] Assignee: JDS Fitel Inc., Nepean, Canada

[21] Appl. No.: 607,105

[22] Filed: Feb. 26, 1996

[51] Int. Cl.⁶ .............................. G02B 5/28; G02B 6/24; G02B 6/42; H01S 3/10

[52] U.S. Cl. .............. 359/589; 359/578; 385/31; 372/20; 372/32

[58] Field of Search ............... 359/577, 578, 359/579, 589; 385/24, 31; 372/6, 20, 32

[56] References Cited

U.S. PATENT DOCUMENTS

| | | | |
|---|---|---|---|
| 4,076,422 | 2/1978 | Kohno | 359/577 |
| 4,213,677 | 7/1980 | Sugimoto et al. | 385/47 |
| 4,285,570 | 8/1981 | Minumura et al. | 385/47 |
| 4,304,460 | 12/1981 | Tanaka et al. | 385/47 |
| 4,550,975 | 11/1985 | Levinson et al. | 385/47 |
| 4,553,816 | 11/1985 | Durand et al. | 359/578 |
| 5,283,845 | 2/1994 | Ip | 385/24 |
| 5,287,214 | 2/1994 | Robertson et al. | 359/578 |
| 5,481,402 | 1/1996 | Cheng et al. | 359/578 |
| 5,539,577 | 7/1996 | Si et al. | 385/31 |

*Primary Examiner*—Jon W. Henry
*Attorney, Agent, or Firm*—Neil Teitelbaum & Associates

[57] ABSTRACT

A multi-pass Fabry-Perot etalon, or bandpass, filter, has a Fabry-Perot cavity defined by two partially reflective mirrors with a gap therebetween and a third reflecting mirror positioned adjacent said two mirrors and arranged to reflect substantially any light eliting said cavity back into it. The filter can replace two single-pass Fabry-Perot etalon filters and can provide lower signal loss and simpler wavelength control.

11 Claims, 4 Drawing Sheets

MULTI-PASS ETALON FILTER

FIELD OF THE INVENTION

This invention relates generally to optical bandpass filters and more particularly to multi-pass Fabry-Perot, or etalon, fiber-optic bandpass filters.

BACKGROUND OF THE INVENTION

A Fabry-Perot etalon filter has two partially reflective mirrors, or surfaces, facing each other and separated by a certain gap which forms a cavity. The spectral characteristics of an etalon filter are generally determined by the reflectivity and gap spacing of the mirrors or surfaces. The Fabry-Perot principle allows a wideband optical beam to be filtered whereby only a spectral passband is transmitted out of the filter. Tuning of the center wavelength of the spectral passband is achieved typically by varying the effective cavity length (spacing).

It is advantageous in certain instances to provide a higher level of faltering, resulting in a more narrow wavelength passband, by effecting two or more passes of the optical beam through a Fabry-Perot cavity (etalon filter). This can obviously be achieved by combining two etalon filters through which the beam is passed in series. However, since the spacing of the cavity is so important, small deviations in the tuning of two separate cavities may result in an unsatisfactory definition of the peak transmission wavelength. Therefore, it is preferable to effect two passes through the same Fabry-Perot (F-P) cavity.

Such an approach has been described for instance in the U.S. Pat. No. 5,283,845 issued Feb. 1, 1994 to J. W. Ip. In one of the embodiments, a transmitted output beam is fed back into the etalon filter and is thus filtered twice through the same F-P cavity through an optical fiber.

Although this arrangement is advantageous over single pass devices, it has associated coupling loss due to the need to couple twice to the optical fiber. Furthermore, the mirror separation may be slightly different at the two beam locations, resulting in differences in peak transmission wavelengths. Thus there is a need for further improvement of the performance of multi-pass etalon filters.

SUMMARY OF THE INVENTION

According to the invention, there is provided a multi-pass optical filter which comprises:

a Fabry-Perot cavity defined by a first partial reflector and a second partial reflector, mounted in a parallel spaced-apart relationship to form a gap between the reflectors, an input port optically coupled to said cavity for launching a light beam into the cavity to produce a filtered light beam, a third reflector disposed adjacent the cavity and arranged to reflect most of the filtered light beam exiting from the cavity back into the cavity, and an output port for porting out a light beam that has been reflected from the third reflector and has passed through the cavity more than once.

The spacing of the first and second partial reflectors may be adjusted to enable the tuning of the center wavelength of the spectral passband of the optical filter.

The input port and the output port may be disposed at an input end of the filter defined by the first partial reflector.

Preferably, the filter comprises means for maintaining a non-zero light beam incidence angle on the first, second and third reflectors to avoid the coupling of the reflected light beam back to the input port.

Preferably, the third reflector is disposed non-parallel to the first and second partial reflectors.

The third reflector may be a partial reflector for control purposes as explained hereinbelow.

BRIEF DESCRIPTION OF THE DRAWINGS

The invention will be explained in greater detail by the following description of its embodiments in conjunction with the accompanying drawings, in which.

DETAILED DESCRIPTION OF THE INVENTION

Figure 1:
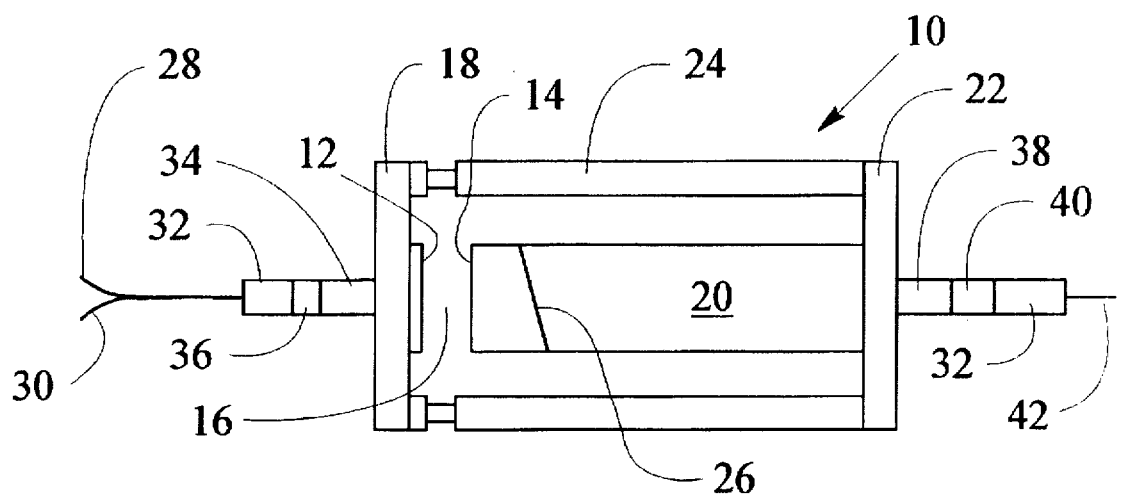
FIG. 1 is a top view illustrating diagrammatically an etalon filter of the invention.
Figure 2:
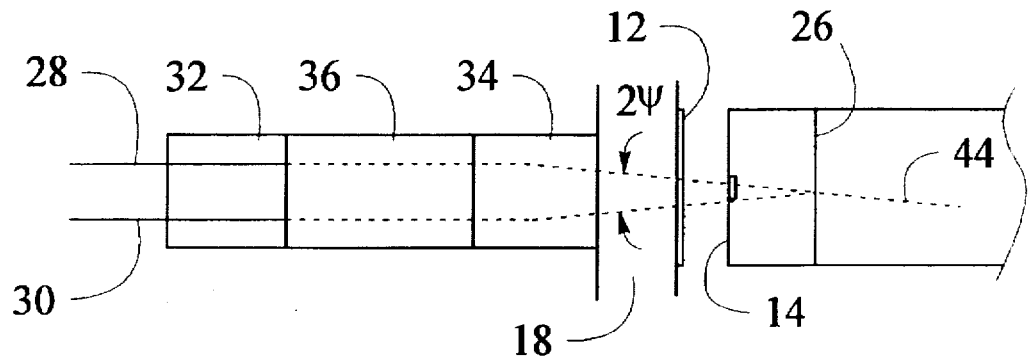
FIG. 2 is an enlarged side view illustrating the route of a light beam through the filter of FIG. 1.

As shown in FIG. 1 and FIG. 2 wherein common reference numerals are used where applicable, a single Fabry-Perot, or etalon, fiber-optic filter 10 has two spaced parallel partially reflecting mirrors 12 and 14 of equal reflectivity, separated by a gap 16. The gap may be filled with air or with a medium having a different refraction coefficient than air, for instance a liquid crystal.

The mirror 12 is supported on an end plate 18 while the mirror 14 is attached to, or formed on, a glass cylinder 20 which is in turn attached to another end plate 22. The end plates 18, 22 are movable relative to each other, their relative distance being controlled by an annular piezoelectric tuning element 24. The element expands lengthwise on application of a voltage changing the gap between the mirrors 12, 14 and thus allowing the peak transmission wavelength to be varied.

A highly reflective mirror 26 is embedded in the glass cylinder 20. This may be accomplished e.g. by providing the glass cylinder 20 in two parts, applying a mirror coating to one of the parts and joining the two parts with a transparent adhesive. As shown in FIG. 1, the mirror 26 is not parallel to the mirrors 12, 14 to prevent etalon effects between the mirrors 12, 14 and the mirror 26. The angular relationship prevents also interference effects between the mirrors 12, 14 and the mirror 26. An input optical fiber 28 defining an input port, and an output optical fiber 30 defining an output port are connected to the filter 10 and mounted in a fiber holder 32 which may have a hole or holes through which the fibers pass. A lens 34 is mounted to collimate the light passed from the input fiber 28 into the filter 10, through the etalon mirrors 12, 14. An optional glass spacer 36 between the two fibers 28, 30 and the lens 34 is provided to compensate for the distance between the lens 34 and the mirror 26 and thereby to increase the coupling efficiency from the input fiber 28 to the output fiber 30. The lens 34 is a graded index lens. The mirror 26 should be close to the adjacent mirror 14 to reduce the coupling loss between the input and output fibers, or ports.

As mentioned above, the third reflector 26 may be partly transmissive. In this case, another lens 38, a spacer (e.g. a glass spacer) 40 and a monitor fiber 42 may be installed to capture the transmitted beam 44 to provide a monitor signal for wavelength tracking purposes.

In operation, a beam of light shown in FIG. 2 in dotted lines, is passed through the input fiber 28 and collimated by the lens 34. Because of the graded refraction index of the lens 34, the beam passes through the etalon mirrors 12, 14 at a non-zero incidence angle as seen particularly in FIG. 2. The beam is then reflected from the mirror 26, passes through the etalon mirrors 12, 14 a second time at an angle to the first pass, and is refocused by the lens 34 into the output fiber 30. By providing the input and output fibers 28 and 30 near to the optical axis of the graded index lens 34 (shown as spaced apart dotted lines in FIG. 2 for clarity), at least of part of the beams conveniently overlap, and thus the beams in both directions essentially follow the same path. This overlap of the beams is shown more clearly in FIG. 4. This is a significant improvement over the prior art, wherein the beams follow two very separate paths which may have different path lengths.

Figure 2B:
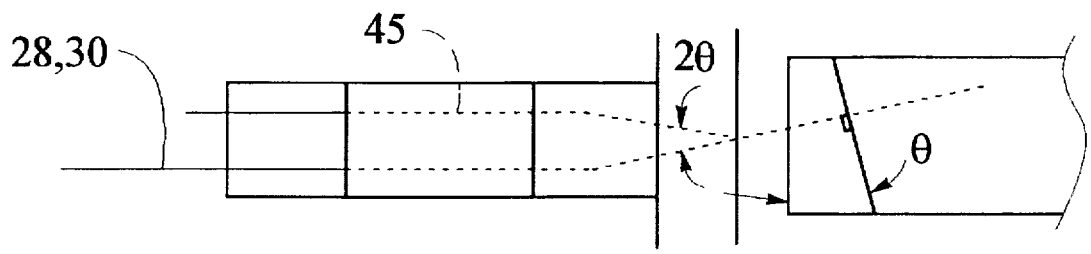
FIG. 2b is an enlarged top view at right angles to the filter shown in FIG. 2.

The optimum positioning of the fibers 28 and 30 is indicated in FIGS. 2 and 2b. The fiber holder 32 may be rotated about the fiber axis to the optimum position during assembly to ensure that the two passes through the etalon mirrors are at the same incidence angle, so that the two passes have the same peak transmission wavelength. This adjustment is made easier if the fiber holder has a cylindrical outer surface.

It will be appreciated that in the filter of the invention, the input light beam passes twice through the etalon filter before reaching the output port; the monitoring tap beam 44 is transmitted through the mirror 26 is not returned to the output fiber 30.

Figure 4:
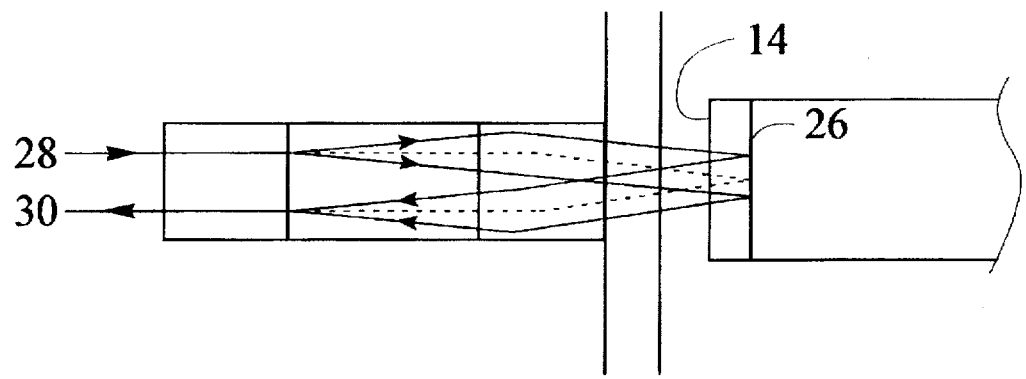
FIG. 4 is an expanded top view as shown from the same direction as FIG. 1 of the etalon filter.

The invention provides, in a single device, the wavelength filtering equivalent of two Fabry-Perot bandpass filters (optionally tunable) in series. The advantages of the double-pass filter over two separate F-P filters are lower loss and simpler wavelength control. The advantages of providing the structure shown in FIG. 1 is that both stages of the double pass filter essentially follow the same path, thereby ensuring the equivalent of two identical filters. This ensures that the peak transmission wavelengths are the same on each pass. While only the central ray is shown in FIGS. 2 and 2b, in fact the collimated optical beam has a certain width as shown in FIG. 4. The physical offset between the two passes can be made much less than the diameter of the collimated beam, by making the distance between 28 and 30 sufficiently small and the distance between 14 and 26 sufficiently small. In this way, most of the light on the second pass is passing through the same region as the first pass. In FIG. 2b, the angle θ causes unwanted reflected light 45, from the mirrors 12 and 14, to focus to a location other than the output fiber 30. If θ=0, i.e. 14 is parallel to 26, the beam 45 would couple into the output 30, and the device would not function as a Fabry-Perot falter.

Advantageously, the invention has lower loss than the prior art device described heretofore. Furthermore a smaller more compact device with fewer lenses is provided. In the absence of a monitor port, the device of this invention conveniently has both ports on the same side. When the monitor port 44 is provided, matching can be performed between the two passes, by comparing the monitor output with the signal at the output port 30.

Figure 3:
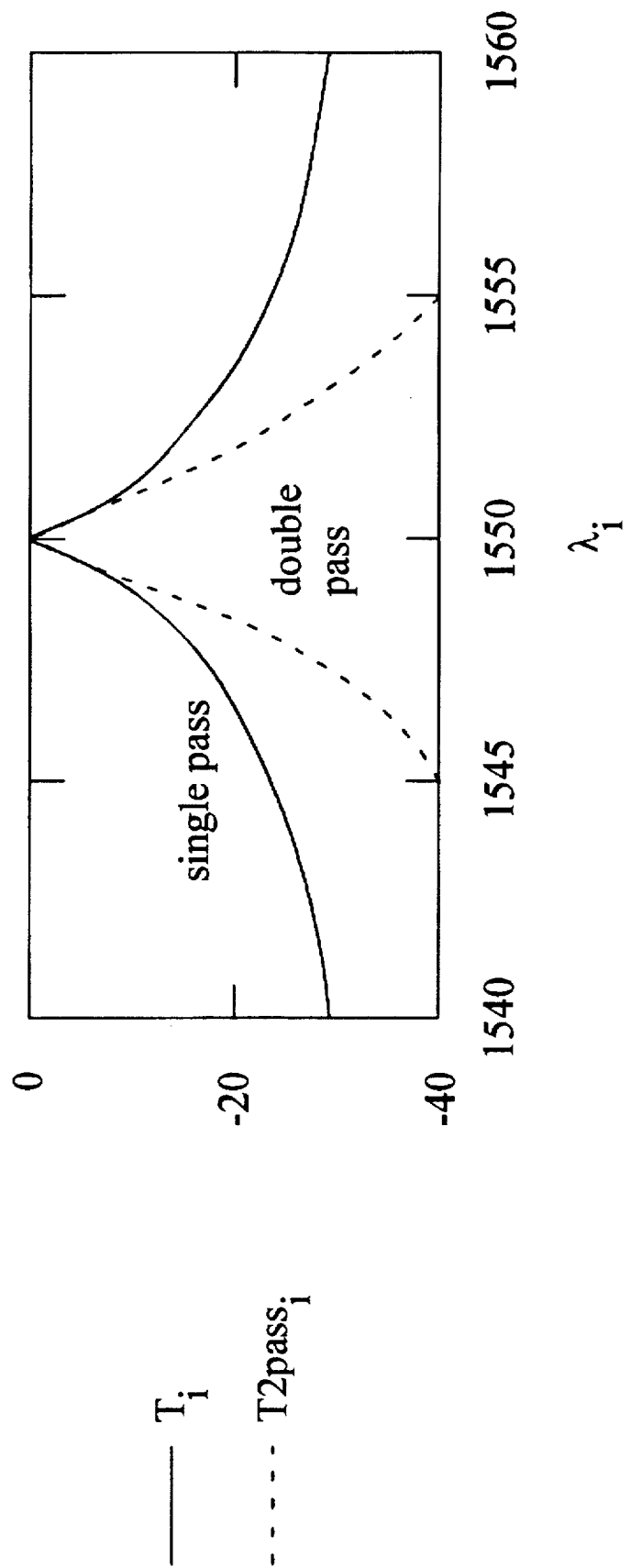
FIG. 3 is a graph illustrating transmission spectra of a single-pass etalon filter (solid line) with a double-pass etalon filter (dashed line).

FIG. 3 illustrates the advantages of a double-pass Fabry-Perot etalon filter over a single-pass filter with the same −3 dB bandwidth. The solid curve is the transmission spectrum of a single F-P filter with free special range 40 nm and −3 dB bandwidth 0.62 nm; the −20 dB bandwidth is 6.2 nm. The dashed curve is the transmission spectrum of two F-P filters in series, each with free spectral range 40 nm and −3 dB bandwidth 1 nm. The effective −3 dB bandwidth of the two filters in series is 0.62 nm and the effective −20 dB bandwidth is 3.0 nm. The narrower −20 dB bandwidth for the two filters in series allows, for example, narrower channel spacing in wavelength division multiplexing applications. The −3 dB bandwidth may have to be larger than a certain minimum value, for example 0.62 nm, to allow a signal with a certain bandwidth to pass. In such a case a single pass F-P filter may be unable to provide the required isolation, for example 20 dB at a certain wavelength from the transmission peak, for example 1.5 nm while a 2 pass F-P filter may be suitable.

Figure 5:
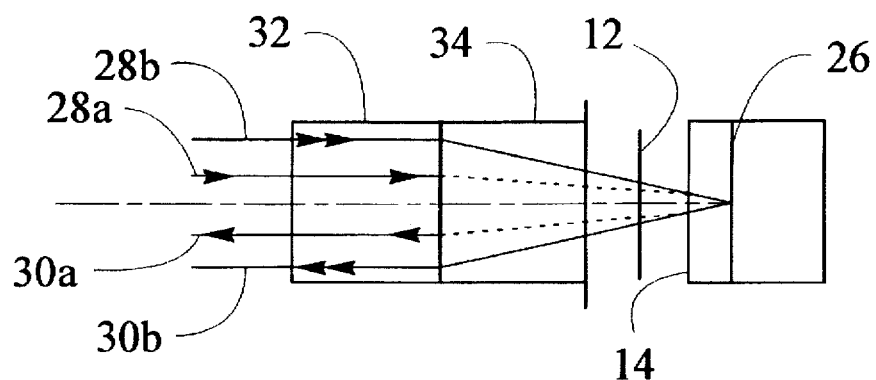
FIG. 5 is a side view of an embodiment of a multi-pass multi-port etalon filter in accordance with the invention.

Turning now to FIG. 5 an alternative embodiment of the invention is shown wherein two double pass Fabry-Perot etalons are provided within the same device. An input beam is provided on optical fiber 28a and is filtered by the double pass filter being output on optical fiber 30a. Another input output path 28b and 30b respectively is provided at a distance further away from the optical axis of the graded index lens 34.

Figure 6:
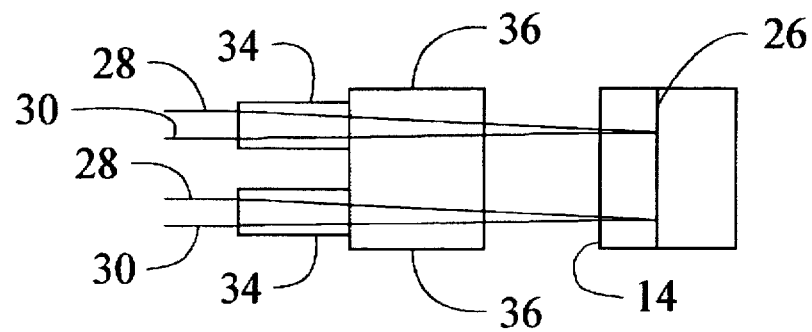
FIG. 6 is a side view of an alternative embodiment of the etalon filter shown in FIG. 5; and, FIG. 7 is a top view of an embodiment of a double-pass etalon filter similar to the one shown in FIG. 1 including an optical detector coupled directly to the far side of the filter.

A similar embodiment is shown in FIG. 6 however, two separate graded index lenses 34 are used, provided two double pass Fabry-Perot etalons within the same device.

Figure 7:
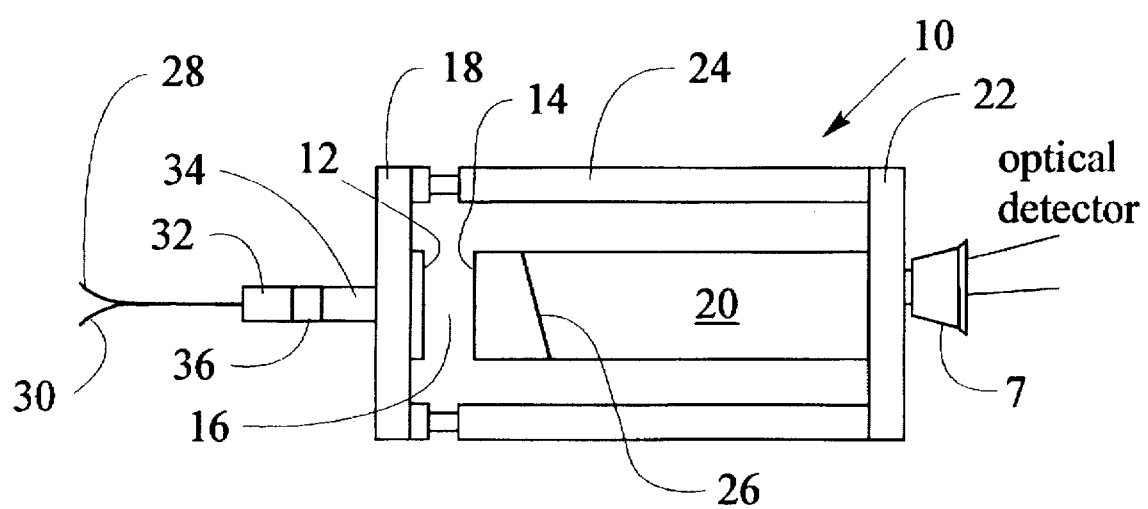

Referring now to FIG. 7 an embodiment of the invention is shown where an optical detector is placed adjacent to and is in contact with transparent end plate 22 to receive a monitoring signal (not shown).

It is understood that numerous other embodiments may be envisaged without departing from the spirit and scope of the invention. For example, the filter is not limited to a double pass design. The piezoelectric tuning element can be replaced with other controllable means for changing the cavity length. The device may be simplified by eliminating the tuning means thus providing a fixed multi-pass (double-pass) cavity. The interfaces between elements 32, 36, 34, and 18 may be angled so that reflections from these interfaces do not interfere with or degrade the optical properties of the device. The lenses 34 and 38 could be conventional type (non-graded index, with a curved surface or surfaces. The spacer 36 or 40 may be an air space, or have zero thickness. In the instance where 16 is not an air space, and is a solid material, 18 may be absent or have zero thickness. The elements are shown as physically contacting one another, however may be separated with support means.

I claim:

1. A multi-pass optical filter which comprises:
   a Fabry-Perot cavity defined by a first partial reflector and a second partial reflector, said reflectors mounted in a parallel spaced-apart relationship to form a gap therebetween,
   an input port optically coupled to said cavity for feeding an input light beam into said cavity in a manner to produce a filtered light beam,
   a third reflector disposed adjacent said cavity and arranged to reflect most of said filtered light beam exiting from said cavity back into said cavity, and an output port for porting out a light beam that has been reflected from said third reflector and has passed through said cavity more than once, wherein the input and the output ports are disposed at locations that ensure that the optical path length defined by a beam of light launched into the input port propagating to the third reflector at a target location is the same as the optical path length of that beam reflected from the target location to the output port.

2. The optical filter of claim 1 further comprising means for adjusting the size of said gap.

3. The optical filter of claim 1 further comprising a graded index lens disposed in the optical path of said input light beam in a manner to enable said beam to pass through said first and second partial reflectors at a non-zero incidence angle.

4. The filter of claim 1 wherein said third reflector is disposed at an angle relative to said first and second partial reflectors.

5. The filter of claim 1 wherein said third reflector is partly transmissive.

6. The filter of claim 5 further comprising means for monitoring the wavelength profile of said filtered light beam.

7. A multi-pass optical filter as defined in claim 1, including a second input port coupled to said cavity for feeding an other input light beam into said cavity in a manner to light beam that has been reflected from said third reflector and has passed through said cavity more than once.

8. The multi-pass optical filter of claim 7 further comprising means for monitoring light that has, passed through the optical filter.

9. The multi-pass optical filter of claim 8, wherein said means is a detector coupled an end of said filter.

10. An optical filter for multi-passing a same wavelength of light which comprises:

a Fabry-Perot cavity defined by a first partial reflector and a second partial reflector, said reflectors mounted in a parallel spaced-apart relationship to form a gap therebetween, an input port optically coupled to said cavity for feeding an input light beam into said cavity in a manner to produce a filtered light beam, a third reflector disposed adjacent said cavity and arranged to reflect most of said filtered light beam exiting from said cavity back into said cavity, a path defined by a filtered light ray exiting from said cavity to said third reflector being equal in length to a path length defined by the same ray of light reflected light from said third reflector to said cavity, and an output port for porting out a light beam that has been reflected from said third reflector and has passed through said cavity more than once.

11. An optical filter as defined in claim 10, wherein the input and the output ports are disposed at locations that ensure that the optical path length defined by a beam of light launched into the input port propagating to the third reflector at a target location is the same as the optical path length of that beam reflected from the target location to the output port.

* * * * *